Jan. 9, 1968   D. B. HOOVER ET AL   3,363,122
HIGH CURRENT TRANSMITTING SHAFT COUPLING
Filed Sept. 15, 1965   3 Sheets-Sheet 1

WITNESSES
Theodore F. Wrobel
Elroy Strickland

INVENTORS
Dillon B. Hoover
and Alexander S. Wolanin
BY
ATTORNEY

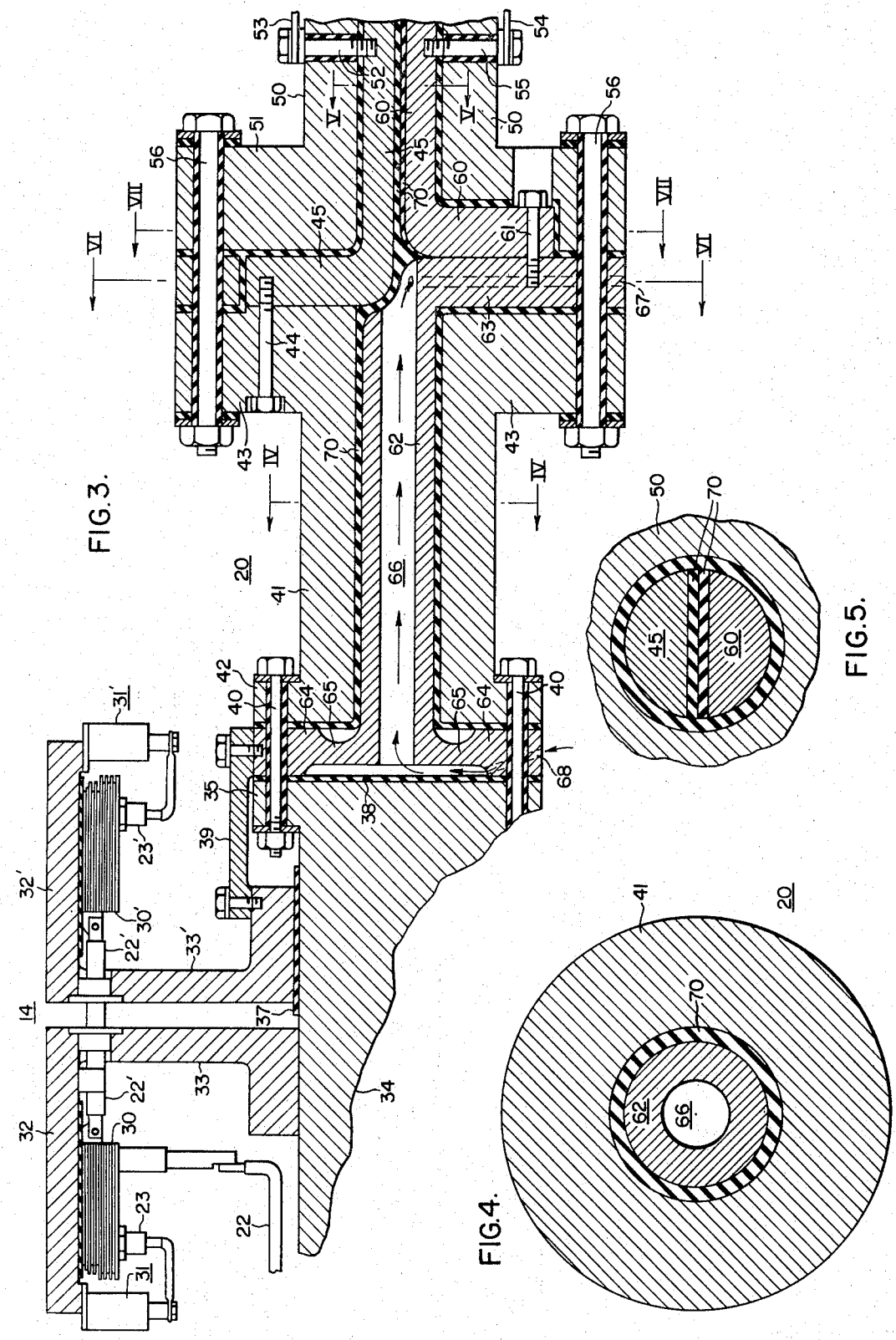

United States Patent Office 3,363,122
Patented Jan. 9, 1968

3,363,122
HIGH CURRENT TRANSMITTING SHAFT
COUPLING
Dillon B. Hoover, Edgewood, Pittsburgh, and Alexander S. Wolanin, Wilkinsburg, Pittsburgh, Pa., assignors to Westinghouse Electric Corporation, Pittsburgh, Pa., a corporation of Pennsylvania
Filed Sept. 15, 1965, Ser. No. 487,428
6 Claims. (Cl. 310—68)

The present invention relates to a novel shaft coupling and cooling means for rotating rectifiers and synchronous alternating current machines of the brushless type.

Synchronous alternating current machines of the brushless type use an alternating current exciter with means for rectifying an alternating current output for supplying direct current excitation to the field winding of the main machine. For this purpose, a rotating rectifier assembly is mounted on the same rotating member as the field of the main machine and the armature winding of the exciter. Such a rectifier assembly preferably consists of a suitable number of semiconductor rectifying devices connected in any suitable rectifier circuit. In this way, an alternating current machine is provided which requires no commutator, slip rings or brushes such as are necessary in the conventional type of machine using a direct current exciter.

At present the rotating rectifier shaft and main generator shaft are mechanically coupled together by a coupling means disposed between the rectifier assembly and the generator. The two units are electrically connected by positive and negative leads extending along the outside of the coupling and may be secured in a longitudinal groove or slot provided in the periphery of the coupling means. If the main generator is cooled, say with hydrogen gas, the generator housing will have to be sealed. In the area of the rotating shaft, the housing is sealed around a journal surface on the shaft. In order to simplify the seal means and insure against cooling gas leaks, the leads from the rotating rectifier exciter are not taken into the generator on the outside of the shaft. Instead, electrical conductors are centrally disposed in the generator shaft, and insulated therefrom, for conducting the rectified current output of the exciter to the field of the generator. The exciter leads contact the centrally disposed conductors through the use of insulated studs located in the shaft outside the area of the generator housing and journaled shaft.

With present power ratings and current requirements, the heat generated in the exciter leads is dissipated through the insulation and through the rotating shaft. However, with ever increasing power and current requirements, more adequate means for cooling the exciter leads is needed, and attendant with the cooling problem caused by increasing power requirements is the size and weight of high current carrying leads. With present designs these leads would be secured on the periphery of shaft coupling means that rotate at high velocities. The securing means would have to secure the lead against the high centrifugal forces developed on the periphery of the coupling means.

It is therefore the principal object of this invention to provide a simple means for mechanically and electrically coupling a rotating rectifier shaft to a main generator shaft while simultaneously providing means for adequately cooling the coupling means.

Another object of the invention is to provide a shaft coupling means for a rotating rectifier and generator that eliminates the necessity of carrying and securing electrical conductor leads on the external surface of the coupling means.

Yet another object of the present invention is to provide a novel fluid flow means for cooling the electrical-mechanical coupling means.

These and other objects of the invention will become more apparent upon consideration of the following detailed description along with the attached drawings, in which:

FIGURES 1 and 2 respectively show mechanical and electrical schematic diagrams of a brushless synchronous generating system in which the present invention is employed;

FIG. 3 is a cross-sectional view along the longitudinal axis of a novel shaft coupling means constructed in accordance with the principles of the invention with some of the associated components shown in elevation;

FIG. 4 is an enlarged transverse section of the novel shaft coupling means viewed from reference plane IV—IV of FIG. 3;

FIG. 5 is an enlarged fragmentary transverse section of the generator shaft viewed from reference plane V—V of FIG. 3;

Figure 1:
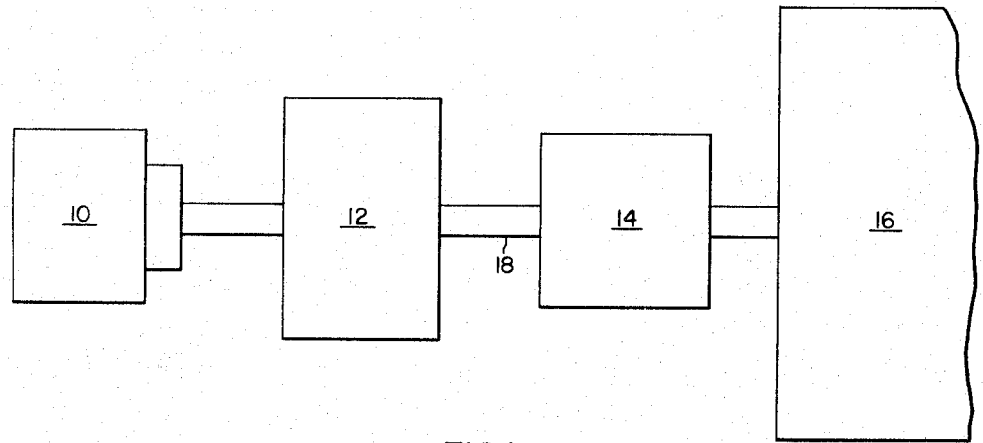

In the figures like reference numerals refer to like parts. More specifically, to illustrate the principles of the invention, there is shown schematically in FIG. 1 an AC power generating system in which is employed a rotating rectifier 14 and a main exciter 12 which provides field energization for main generator 16 through rotating rectifier 14. If desired, one or more fuse wheels (not shown) may be suitably disposed in the system of FIG. 1 and interconnected between main exciter 12 and rectifier 14 for the purpose of diode circuit protection. Main exciter 12 receives its field energization from pilot exciter 10. Preferably, a mechanically common shaft 18 is provided for the power system, and when it is rotated by a suitable source of mechanical power, the system of FIG. 1 is electrically self-started and self-sustained by means of pilot and main exciters 10 and 12.

Figure 2:
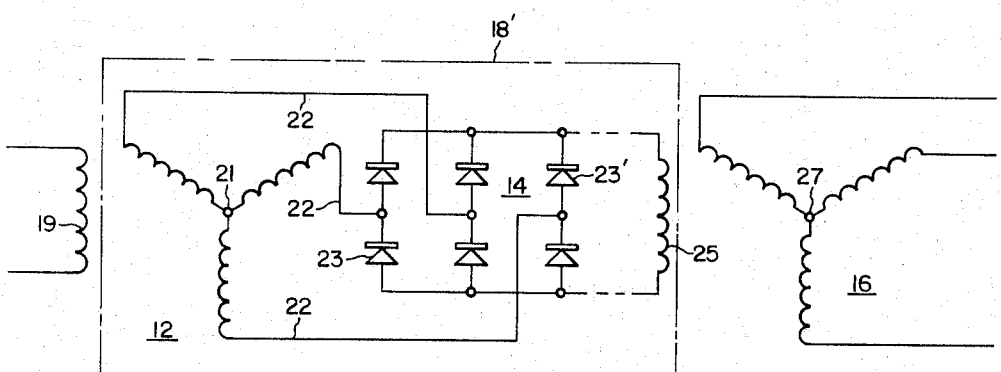

In the circuit of FIG. 2, shaft 18 is shown in dot-dash outline 18' so as to indicate those components which undergo rotation. Main exciter 12 thus includes a rotating armature 21 which is electromagnetically related to a DC field 19, and in this instance, armature 21 generates three-phase AC voltages in the three-phase windings shown. Other winding arrangements can be used according to the voltage generating characteristics desired. The electrical output of armature 21 is applied through leads 22 to six diodes 23 representatively shown in rotating rectifier 14. (Six diodes are shown only for purposes of illustration.) Rectified (DC) voltage is thus applied to the field windings 25 on the rotor of main generator 16. Generated power voltage then appears across stationary armature 27 of generator 16. The rectified voltage may be applied to field 25 through fuses 31 as representatively shown in FIG. 3.

In the machines presently used, the leads connecting diodes 23 to main generating field 25 are brought across and physically secured to mechanical means coupling the rectifier and generator shafts together. As previously mentioned, the contemplated extensive increase in power ratings creates problems involving size, space and heat dissipation with the connecting leads secured on the shaft coupling means. With the increase in size there is the consequent increase in the weight of leads with the problem of securing the leads against the centrifugal forces developed on the periphery of the coupling means.

In keeping with single shaft arrangements of rotating rectifier excited generating systems, FIGS. 3 through 7 show a novel coupling means 20 that overcomes the above-named problems while simultaneously permitting ease of electrical and mechanical assembly and disassembly of the high current carrying elements and the torque transmitting elements associated with rectifier 14 and main generator 16.

In FIG. 3, coupling means 20 mechanically couples rectifier exciter shaft 34 to a hollow generator shaft 50 and electrically connects exciter shaft 34 (used as a conductor) and exciter connector 39 to generator conductors 45 and 60 respectively centrally disposed in the hollow generator shaft 50.

Novel coupling means 20 comprises an outside hollow shaft means 41, which may be made of steel, having flanged ends 42 and 43 surrounding a centrally disposed hollow electrical conductor 62 which may be made of copper or other low resistance material having flanged or equivalent ends 63 and 64. Centrally disposed conductor 62 is insulated from coupling shaft 41 by insulating sleeve 70 with properly located perpendicular extensions insulating the conductor flanges 63 and 64 from the flanged ends 42 and 43 of coupling shaft 41. Conducting flanges 64 are further insulated from rectifier exciter shaft 34 by insulating means 38 disposed between the face end of shaft 34 and one side of flange 64.

Centrally disposed electrically conductor 62 has a bore 66 extending longitudinally through the center thereof in communication with a plurality of spaced, radially extending holes 67 and 68 in conductor flanges 63 and 64 respectively. Holes 67 can best be seen in FIG. 6 where they are shown in elevation. The dimensions of holes 67, 68 and bore 66 are designed to effect a cooling fluid flow through the conductor when the shafts and coupling means rotate. The hole designs create a pressure differential between the ends of bore 66 as coupling means 20 rotates thus forcing a flow of air or other suitable cooling fluid through electrical conductor 62 and its flanged ends 63 and 64. It thus becomes clear that current conductor 62 is effectively and efficiently cooled by the coolant medium forced through bore 66. The heat generated in conductor 62 by the high currents flowing therein is quickly removed by the rapid flow of the coolant medium.

Flange end 64 of the electrical conductor is further provided with a narrow section generally designated 65. Section 65 permits thermal expansion and contraction of the electrical conducting means within shaft coupling means 41 without producing undue stress on the conductor means.

The mechanical construction of rotating rectifier 14 may take the form shown in FIG. 3 in which two wheel members 33 and 33' have hub portions suitably secured to shaft 34 in back to back relation such as shown and described in the copending application of Dillon B. Hoover, Ser. No. 455,206, filed May 12, 1965, and assigned to the present assignee. Wheel members 33 and 33' have annular rims or flange means 32 and 32' utilized to support a plurality of simiconducting diodes 23 and 23' around the inside surface thereof but insulated therefrom. The number of diodes and wheel members used may vary depending upon the rating of diodes and of the rectifier system which in turn is determined by the requirements of the main generator field. The semiconducting diodes are preferably of the silicon type because of their high current carrying capacity and their ability to withstand extreme rotational forces. Diode 23 and 23' are secured to flange members 32 and 32' via heat sink members 30 and 30' respectively suitably affixed to the flanges on the inside surface thereof.

In operation, alternating current is applied to insulated leads 22, one of which is shown in elevation in FIG. 3, secured around the periphery of shaft 34 by suitable means (not shown). The current travels to diodes 23 through heat sinks 30 and lead connectors attached thereto. The voltage is rectified by the diodes and is applied to flange member 32 (which can function as a common bus for diode outputs) through suitable connecting leads and fuses 31, only representatively shown. The alternating current applied to diodes 23 is also applied to diodes 23' or rim or flange 32' through insulated lead 22' extending through openings provided in wheel sections 33 and 33'.

A positive polarity, rectified current from diodes 23 is conducted along rim or flange 32 and wheel section 33 to rectifier shaft 34 where the hub portion of wheel 33 is in direct electrical contact with shaft 34. From the shaft DC voltage is applied to hollow shaft 41 through the electrically conducting bolts 40 or other suitable means designed to perform simultaneously the function of securing shaft 34 to shaft 41. Bolt means 40 are insulated along their shank portions since shaft flanges 35 and 42 support and secure conducting flanges 64 that form a part of the return (negative polarity) path from generator field 25. Coupling shaft means 41 functions as a positive conductor for the rectified current travelling from rectifier 14 to the field of generator 16. Conducting shaft flange 43 is secured in electrical contact with an extension of insulated conductor 45 centrally disposed in generator shaft 50 and secured between coupling shaft flange 43 and generator shaft flange 51 by bolt 44 extending through an opening in flange 43 and threaded into conductor 45. Conductor 45 may consist of copper straps or laminations suitably bent near the ends thereof to form the conductive extension secured between flanges 43 and 51. In any case, conductor 45 is in electrical contact at one end thereof with current carrying shaft 41 and at the other end thereof with insulated stud means 52 perpendicularly disposed in generator shaft 50. From stud means 52 the positive current is conducted to field 25 of generator 16 via lead 53 suitably attached to the stud.

A return path to rectifier exciter 14 from generator field windings 25 is provided by components contained in the same novel shaft coupling arrangement described above. Lead 54, suitably connected to the generator field is secured to and in electrical contact with perpendicular stud means 55 which may be threaded into (negative) current carrying conductor 60. Conductor 60 may be structurally identical to conductor 45 and secured in the bottom center of generator shaft 50.

Conductors 45 and 60 are suitably insulated from shaft 50 and from each other by insulating means generally designated 70. A single layer of insulation may separate their opposing faces, and a single insulating sleeve may surround the two conductors to insulate them from shaft 50, or each conductor may be fitted with an insulating sleeve having a half circle configuration in cross section. A part of the insulating sleeve that surrounds conductor 62 in shaft 41 may extend into shaft 50 (as shown) and form the centrally located insulator between conductors 45 and 60. In any case, conductor 60 forms part of the negative return lead from generator 16 and is in electrical contact with and physically secured to conductor flange 63 by securing bolt 61.

Figure 6:
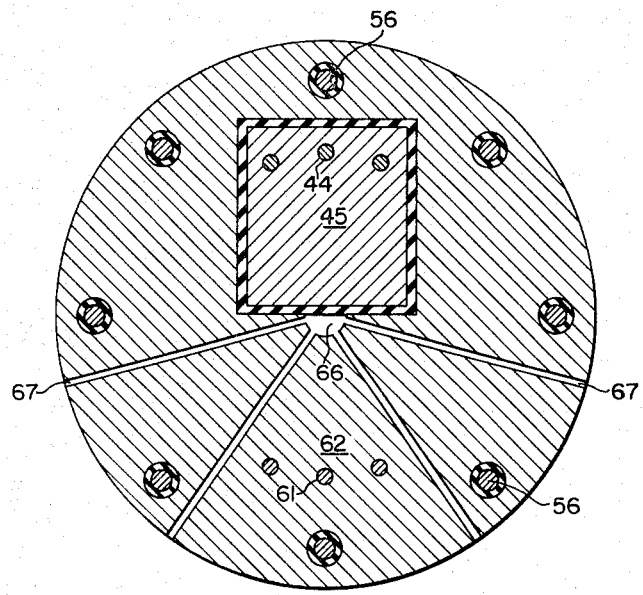
FIG. 6 is a transverse section of the novel coupling means viewed from reference plane VI—VI of FIG 3.
Figure 7:
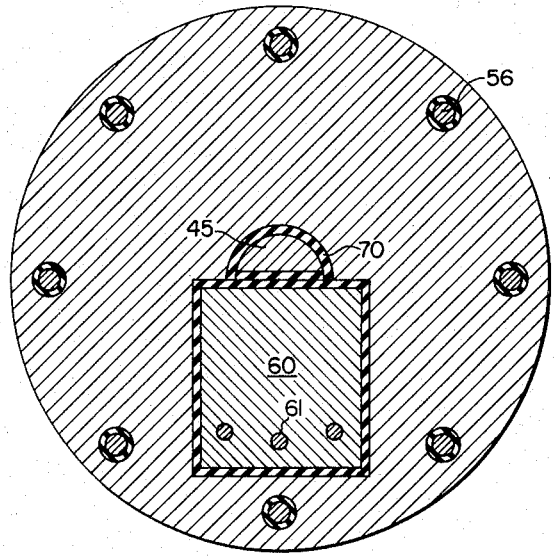
FIG. 7 is a transverse section of the novel coupling means viewed from reference plane VII—VII of FIG. 3.

As seen in FIG. 6, bolts 61 are located between fluid flow openings 67. Similarly, bolts 56 are generally distributed around the abutting flanges so as to straddle openings 67. Current travels across the abutting faces of flange 63 and conductor 60 (being in physical and electrical contact as shown in FIG. 3) and travels along centrally disposed conductor 62 to conductor flange ends 64. The conductive path is completed to rectifier wheel 33' (insulated from shaft 34 by insulating sleeve 37) by a plurality of low resistance connecting means 39 properly secured to flange 64 and the hub portion of insulated rectifier wheel 33'. Connectors 39 are generally distributed around the periphery of shaft flanges 35 and 42 at spaced intervals. Only one such connector is shown in FIG. 3 in cross-section. The current path is completed to diodes 23' from connectors 39 via wheel section 33', rim 32' and fuses 31' (only representatively shown). Thus, novel shaft coupling means 20 provides a current path in both directions between rotating rectifier 14 and main generator 16.

It should be now apparent from the foregoing description that a novel shaft coupling means has been disclosed that is particularly useful in high power rated synchronous machines of the brushless type excited by rotating rectifiers. Coupling 20 eliminates the necessity of carrying connecting leads externally along the shaft coupling means thereby eliminating means necessary for securing heavy (high current carrying) leads against the rotational forces developed on the periphery of the coupling means. At the same time, a simplified coupling means is provided that allows a rotating rectifier and generator to be mechanically and electrically coupled thereby making possible easy and quick assembly and disassembly of torque transmitting components and current conducting components. In addition, the enclosed high current conducting elements are cooled by a flow of air or other suitable fluid through the center thereof needing no pumps or other fluid flow forcing means. Such a cooled coupling means guarantees a surety of operation and ease of maintenance heretofore unavailable.

Though the invention has been described with a certain degree of particularity, it is to be understood that this present disclosure has been made by way of example only and that numerous changes in details, combination and arrangement of parts may be accomplished without departing from the spirit and scope of the invention.

We claim as our invention:

1. A means for mechanically coupling the shafts of a rotating rectifier and generator together and for electrically connecting the rectifier to the field of the generator comprising a hollow shaft means containing an insulated hollow electrical conductor in the center thereof for allowing the flow of a cooling fluid therethrough, said shaft and said conductor having means on the ends thereof for securing the shaft to adjacent ends of the rectifier and generator shafts and for electrically connecting the rotating rectifier to the field of the generator.

2. A means for coupling a rotating rectifier shaft and a generator shaft together comprising a hollow shaft with means on each end thereof for mechanically securing to adjacent ends of the rectifier and generator shafts, a hollow electrical conductor contained within the hollow shaft, said conductor electrically connecting the rectifier to the field of the generator, said hollow conductor constructed to force a flow of air therethrough.

3. A cooling arrangement for a rotating rectifier and generator shaft coupling means, the generator shaft being hollow and supporting electrical conductors therein and insulated therefrom, said shafts and said conductors each having at least on flanged end, means for mechanically and electrically coupling the generator shaft and conductors to the rectifier shaft and rectifiers comprising a hollow shaft means supporting an electrical conductor therein having an axial hollow bore extending therethrough, said hollow electrical conductor having radial end extensions for electrically connecting to the flanged end of one of said conductors in the generator shaft and to rectifier connections on the rotating rectifier shaft, said hollow shaft couplig means having radial end extensions for mechanically securing the ends thereof to the flanged ends of the rectifier and generator shafts, the radial end extensions of the hollow electrical conductor having holes therein for permitting fluid flow into and out of the hollow bore in the electrical conductor.

4. A means for coupling a rotating rectifier wheel disposed on a shaft and a generator shaft together comprising a hollow shaft with means on each end thereof for mechanically securing to the ends of adjacent rectifier and generator shafts, a hollow electrical conductor contained within the hollow shaft for electrically connecting the rotating rectifier wheel to the field of the generator, a plurality of connecting means disposed around the periphery of the rectified shaft at spaced intervals for electrically connecting the rectifier wheel to said hollow electrical conductor, said hollow electrical conductor having means in the ends thereof for forcing a flow of fluid through the conductor.

5. A fluid cooled shaft coupling and electrical connecting means for rotating rectifier exciter and generator having shafts extending axially therebetween, said generator shaft having an axial hollow bore containing at least two electrical conductors insulated from the shaft and from each other, said generator shaft and conductors having coupling and electrical connecting means respectively on the ends thereof adjacent the rotating rectifier exciter, said exciter shaft having coupling means on one end thereof adjacent the generator and electrical connecting means disposed around the periphery of the shaft end at spaced intervals, said fluid cooled shaft coupling and connecting means disposed between the adjacent ends of the rectifier and generator shafts, said fluid cooled shaft comprising a hollow shaft containing a hollow electrical conductor, said hollow shaft having means securing the ends thereof to the coupling means on the ends of the rectifier and generator shafts, said hollow electrical conductor having means connecting the ends thereof to the conecting means on the ends of the rectifier and generator connecting means for applying the rectified output voltage of the rotating rectifier exciter to the field of the generator, the ends of said hollow electrical conductor having means forcing a cooling fluid through the conductor, the hollow coupling shaft acting as a second conductor in electrical contact with the rectifier shaft and one of the insulated conductors in the hollow generator shaft.

6. A fluid cooled coupling arrangement for mechanically and electrically coupling a rotating rectifier exciter and generator rotor comprising a hollow shaft containing a hollow electrical conductor in the center thereof and insulated therefrom, the ends of said shaft and conductor being mechanically and electricaly coupled to the ends of the exciter and rotor shafts and electrical connectors respectively, each of the conductor ends forming a radially extending flange having a narrow portion providing a flexible body, said flange having radially extending holes therein for permiting air flow into and out of the hollow electrical conductor.

References Cited

UNITED STATES PATENTS

| | | | |
|---|---|---|---|
| 2,897,383 | 7/1959 | Barrows | 310—68 |
| 3,030,531 | 4/1962 | Lessmann | 310—68 |
| 3,114,094 | 12/1963 | Lee | 310—68 |
| 3,145,314 | 8/1964 | Becker | 310—68 |

MILTON O. HIRSHFIELD, *Primary Examiner.*

J. D. MILLER, *Examiner.*